(12) United States Patent
Vedula (10) Patent No.: US 7,574,330 B2
(45) Date of Patent: Aug. 11, 2009

(54) METHOD AND APPARATUS FOR ANALYZING ENGINEERING PROBLEMS USING A FINITE ELEMENT TECHNIQUE WITH DIFFERENTIAL FORMULATION

(75) Inventor: Phanindranath Vedula, Rochester Hills, MI (US)

(73) Assignee: Siemens Product Lifecycle Management Software Inc., Plano ( * ) Notice: Subject to any disclaimer, the term of this patent is extended or adjusted under 35 U.S.C. 154(b) by 539 days.

(21) Appl. No.: 10/313,909

(22) Filed: Dec. 6, 2002

(65) Prior Publication Data

US 2004/0111242 A1    Jun. 10, 2004

(51) Int. Cl.
*G06F 17/10* (2006.01)
(52) U.S. Cl. .......................................... 703/2
(58) Field of Classification Search ........................ 703/2
See application file for complete search history.

(56) References Cited

OTHER PUBLICATIONS

J.N. Reddy et al. "The Finite Element Method in Heat Transfer and Fluid Dynamics", 1994, CRC Press, Inc., vol. 1, 25-39,58,59,67,97-98,135,145-146,151-152,167-170, 361-371.*

Felippa; Equation Modification Methods; Apr. 2001; pp. 1-10; obtained from http://www.colorado.edu/engineering/CAS/Felippa.d/FelippaHome.d/Publications.d/ModEq.pdf.*

Wikipedia definition for Finite Element Method; obtained from http://en.wikipedia.org/wiki/Finite_element_method.*

Quartapelle (numerical solution of the incompressible Navier-Stokes equations); pp. 214-215; (Birkhäuser Verlag, Basel, 1993).*

Beilina et al. (a hybrid method for the wave equation); Uppsala University Report; pp. 1-30; Oct. 2001.*

Youn et al. (A New Direct Higher-Order Taylor-Galerkin Finite Element Method); Computers & Structures vol. 56. No. 4. pp. 651-656. 1995.*

* cited by examiner

*Primary Examiner*—Hugh Jones
(74) *Attorney, Agent, or Firm*—Michael J. Wallace (57) ABSTRACT

A method and apparatus facilitate accurate and efficient numerical solution of governing equations for various analyses. One form of the invention involves: dividing a region of interest into a plurality of higher order finite elements; determining for each of the finite elements a respective approximate solution based on piecewise approximation relating to the region; determining a differential formulation which approximates a governing equation; and combining the approximate solutions and the differential formulation using mixed order approximation to obtain a set of algebraic equations.

20 Claims, 4 Drawing Sheets

METHOD AND APPARATUS FOR ANALYZING ENGINEERING PROBLEMS USING A FINITE ELEMENT TECHNIQUE WITH DIFFERENTIAL FORMULATION

TECHNICAL FIELD OF THE INVENTION

This invention relates in general to techniques for analysis and, more specifically, to techniques for analyzing engineering problems such as thermal, structural, fluid flow and vibration problems.

BACKGROUND OF THE INVENTION

Analysis of many engineering problems involve obtaining the solution of complex governing differential equations in a domain of interest. For example, thermal analysis involves the solution of a three dimensional heat conduction equation, fluid flow analysis involves the simultaneous solution of conservation of mass and Navier Stokes equations, and structural and vibration analysis involve the solution of equations based on conservation of momentum and energy. Due to the degree and order of these governing equations, analytical solutions are feasible only for simple geometries and cases involving one and two dimensions. For more generic problems involving complex three dimensional geometries and heterogeneous materials, analytical solutions to the governing differential equations are impractical. Consequently, various pre-existing numerical techniques have been developed for the purpose of solving differential equations. In this regard, pre-existing finite difference methods, finite element methods and boundary element methods are widely used to solve many complex engineering problems. However, while these various pre-existing techniques have been generally adequate for their intended purposes, they have not been satisfactory in all respects In more detail, finite difference methods use pointwise approximations with differential formulation. In other words, approximate solutions are obtained at several points in the region or domain of interest, and governing differential equations are transformed into algebraic equations using finite difference approximation. However, due to the use of pointwise approximation, the solutions have acceptable accuracy only at the specific points selected within the region of interest. Moreover, finite difference methods cannot accurately represent complex geometries, due to the use of pointwise approximation.

Finite element and boundary element methods use piecewise approximations with integral formulation. In other words, a region of interest is approximated within finite regions called finite elements, and these approximations are then used to transform governing differential equations into algebraic equations with standard integral formulation methods, such as a variational approach, weighted integrals, virtual work, or the like. Although these methods can represent complex geometries and can yield accurate results, integral formulations are very complicated, and even computerized computation of a solution takes a long time and consumes a lot of memory.

SUMMARY OF THE INVENTION

From the foregoing, it may be appreciated that a need has arisen for a method and apparatus for numerically solving a differential equation in a manner which is relatively accurate and efficient, and which avoids at least some of the disadvantages of pre-existing techniques. One form of the invention is based on piecewise approximation with differential formulation, and involves: dividing a region of interest into a plurality of higher order finite elements; determining for each of the finite elements a respective approximate solution based on piecewise approximation relating to the region; determining a differential formulation which approximates a governing equation; and combining the approximate solutions and the differential formulation using mixed order approximation to obtain a set of algebraic equations. The invention has other forms.

BRIEF DESCRIPTION OF THE DRAWINGS

A better understanding of the present invention will be realized from the detailed description which follows, taken in conjunction with the accompanying drawings, in which.

DETAILED DESCRIPTION

Figure 1:
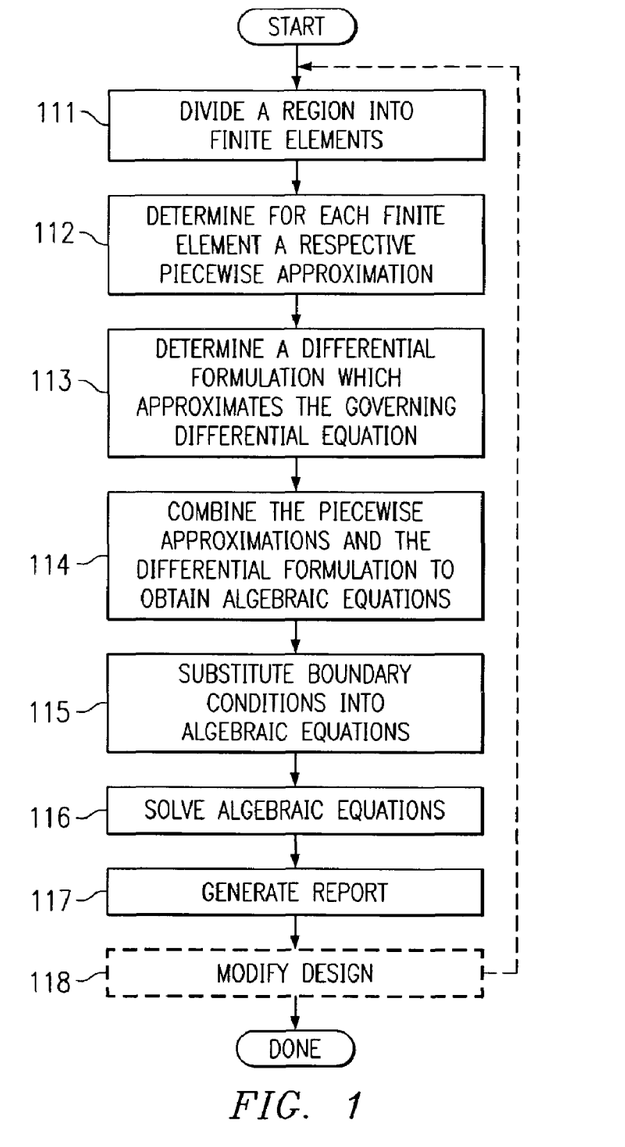
FIG. 1 is a flowchart showing an example of a sequence which embodies aspects of the invention.

FIG. 1 is a flowchart having a sequence of blocks 111-118, which embody a process according to the present invention. The blocks of FIG. 1 are each discussed in more detail later, in the context of some exemplary scenarios. At this point, an overview is provided for part of the process of FIG. 1. In this regard, the process of FIG. 1 implements a novel numerical solution for certain types of problems. This numerical solution is an approximation, but is computationally efficient and relatively accurate.

More specifically, the process shown in FIG. 1 involves a numerical technique that is based on piecewise approximation in finite elements with differential formulation, and that can be referred to as finite elements with differential formulation (FED). The process of FIG. 1 includes: (1) division in block 111 of a region or domain into finite elements (higher order elements which are at least second order elements), (2) piecewise approximation of the unknowns in terms of geometrical dimensions in block 112, (3) differential formulation of one or more governing differential equations in block 113, (4) combining of the piecewise approximations and differential formulation in block 114 using mixed formulation in order to transform governing equations into algebraic equations, (5) substitution of boundary conditions into the algebraic equations in block 115 in order to eliminate singularities, and (6) solution of the algebraic equations in block 116.

In order to facilitate a clear understanding of the present invention, a detailed explanation will now be presented in the context of some selected exemplary situations that each relate to heat conduction, where the heat conduction characteristic is represented by a partial differential equation. However, the present invention can be utilized in a wide variety of other situations which involve various other differential equations, such as fluid flow, structural or vibration situations.

As is known in the art, the partial differential equation for general three-dimensional heat conduction is:

$$\frac{\partial}{\partial x}\left(k_x \frac{\partial T}{\partial x}\right) + \frac{\partial}{\partial y}\left(k_y \frac{\partial T}{\partial y}\right) + \frac{\partial}{\partial z}\left(k_z \frac{\partial T}{\partial z}\right) + \dot{q} = \rho C_p \frac{\partial T}{\partial t} \quad (1)$$

where:
T is the temperature distribution,
x, y, and z are spatial dimensions,
t is time,
$\dot{q}$ is the heat generation per unit volume,
$k_x$, $k_y$, and $k_z$ are respective thermal conductivities in the x, y, and z directions,
$\rho$ is the mass density, and
Cp is the specific heat.

Figure 2:
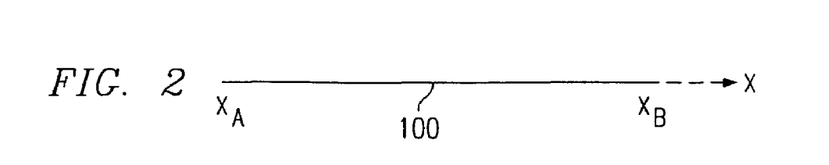
FIG. 2 is a diagrammatic view of an elongate rod or beam which is used to demonstrate a one-dimensional analysis according to the sequence shown in FIG. 1.

FIG. 2 is a diagrammatic view of a thermally conductive rod or beam 100, which represents the first exemplary situation in which the present invention will be discussed. The beam 100 is assumed to be extending along an x axis, and to have its ends at respective points $x_A$ and $x_B$ along the x axis. The length of the beam 100 is much greater than any transverse dimension of the beam, such that temperature gradients in transverse dimensions are negligible. Accordingly, for purposes of the following analysis, the beam 100 is represented in FIG. 2 by a line, and is analyzed in one dimension (along its length), rather than as a three-dimensional object. The beam is assumed to be isotropic. Thus, the beam 100 shown in FIG. 2 represents a one-dimensional, steady-state heat transfer problem in a material with isotropic properties. As discussed later, the present invention is also applicable to multi-dimensional analysis, but presenting an initial explanation in the context of a one-dimensional analysis will facilitate a clear understanding of the present invention, without unnecessary complexity.

As noted above, the material of the beam 100 is isotropic, so that:

$k_x = k_y = k_z = k$

Since one-dimensional steady state heat conduction is being considered, which means that $$\frac{\partial T}{\partial t} = 0,$$

three-dimensional Equation (1) reduces to:

$$k \frac{\partial^2 T}{\partial x^2} + \dot{q} = 0. \quad (2)$$

Equation (2) can be rewritten as:

$$\frac{\partial^2 T}{\partial x^2} + \frac{\dot{q}}{k} = 0. \quad (3)$$

In order to solve Equation (3) to determine the temperature T at a location between points $x_A$ and $x_B$, two boundary conditions are needed. In the present example, the boundary conditions are known temperatures at each end of the beam 100, as follows:

T at $x_A = T_A$

T at $x_B = T_B$ \quad (4)

The analytical solution for Equation (3), using the boundary conditions of Equation (4), can be expressed as:

$$T = \frac{\dot{q}}{2k} x^2 + \left\{ \frac{T_B - T_A}{l} - \frac{\dot{q}}{2k} l \right\} x + T_A \quad (5)$$

where $l = (x_B - x_A)$.

Although Equation (5) represents the analytical solution, the present invention involves a novel numerical solution, which is an approximation, but which is computationally efficient and accurate. This numerical solution, aspects of which are embodied in the process of FIG. 1, involves piecewise approximation in finite elements with differential formulation.

In more detail, and with reference to block 111 in FIG. 1, the first step in the process involves dividing the entire domain or region of interest into finite elements. In the case of the beam 100 of FIG. 2, the domain is the overall length of the beam 100. With reference to block 111 in FIG. 1, this domain is to be divided into at least one finite element, and the temperature distribution in each such element is then approximated with a respective second-order curve. To the extent that a characteristic such as temperature distribution is to be approximated with a curve of second or higher order for any given finite element, that finite element is sometimes referred to herein as a higher order finite element. For simplicity in the case of the beam 100, it is initially assumed that the entire domain is divided into a single finite element. For purposes of the present invention, dividing the beam 100 into only a single finite element is a theoretical possibility, but has limited practical value. Nevertheless, for the sake of clarity and understanding, the process of FIG. 1 is initially explained in the context where the beam 100 is divided into a single finite element. Thereafter, a further explanation will be provided in a more practical context where the beam 100 is divided into many finite elements.

Figure 3:
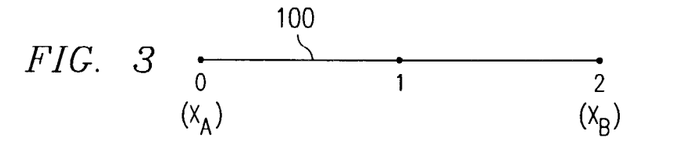
FIG. 3 is a diagrammatic view of the beam of FIG. 2, showing a single finite element and multiple nodes selected for the purpose of analysis.

FIG. 3 is a diagrammatic view of the beam 100 of FIG. 2, except that three nodes 0, 1 and 2 have been identified, where the nodes 0 and 2 are at respective ends of the beam 100, and the e 1 is between the nodes 0 and 2. In FIG. 3, the single finite element for purposes of the present example is the portion of the beam between node 0 and node 2, which happens to be the entire beam 100. With reference to block 112 of FIG. 1, the next step in the process is to determine a respective approximate solution to governing differential Equation (3) for each finite element. Of course, the present example involves only a single finite element, which is the entire beam 100. In the context of the beam 100, the temperature distribution within the finite element of FIG. 3 will be approximated by a second order curve, which can be represented algebraically by:

$$T = a_0 + a_1 x + a_2 x^2 \qquad (6)$$

where $a_0$, $a_1$ and $a_2$ are coefficients. Equation (6) can also be written as:

$$T = [X]\{a\} \qquad (7)$$

where:

$$[X] = [1 \; x \; x^2]$$

and $$\{a\} = \begin{Bmatrix} a_0 \\ a_1 \\ a_2 \end{Bmatrix}. \qquad (8)$$

With reference to FIG. 3, assume that the temperatures at nodes 0, 1 and 2 are respectively denoted as $T_0$, $T_1$ and $T_2$. The temperature distribution $T_e$ within the finite element shown in FIG. 3 can then be expressed in terms of its nodal temperatures $T_0$, $T_1$ and $T_2$ as:

$$\{T_e\} = \begin{Bmatrix} T_0 \\ T_1 \\ T_2 \end{Bmatrix}. \qquad (9)$$

The temperature distribution $T_e$ can alternatively be expressed as:

$$\{T_e\} = [A]\{a\} \qquad (10)$$

where:

$$[A] = \begin{bmatrix} 1 & x_1 & x_1^2 \\ 1 & x_2 & x_2^2 \\ 1 & x_3 & x_3^2 \end{bmatrix}.$$

Substituting Equation (10) into Equation (7) so as to eliminate the term $\{a\}$ yields:

$$T = [N]\{T_e\} \qquad (11)$$

where:

$$[N] = [X][A]^{-1} \qquad (12)$$

and $$[N] = [N_0 \; N_1 \; N_2]. \qquad (13)$$

In Equations (11) through (13), [N] is the shape function matrix that is known to apply to a body having the shape of the beam 100. In this shape function matrix, the values $N_0$, $N_1$ and $N_2$ can be expressed as Langrangian multipliers. The Langrangian multipliers for second order curve elements are:

$$N_0 = \frac{(x_1 - x)(x_2 - x)}{(x_1 - x_0)(x_2 - x_0)} \qquad (14)$$
$$N_1 = \frac{(x_0 - x)(x_2 - x)}{(x_0 - x_1)(x_2 - x_1)}$$
$$N_2 = \frac{(x_0 - x)(x_1 - x)}{(x_0 - x_2)(x_1 - x_2)}.$$

Consequently, and based on Equations (11) and (14), the temperature at any location x between node 0 and node 2 in the finite element of FIG. 3 can be expressed as:

$$T = [N_0 \; N_1 \; N_2] \begin{Bmatrix} T_0 \\ T_1 \\ T_2 \end{Bmatrix}. \qquad (15)$$

With reference to block 113 in the flowchart of FIG. 1, the next step in the process is to determine a differential formulation of governing differential Equation (3). This is effected using finite difference approximation. In particular, governing differential Equation (3) is approximated for the entire region using a first order expansion of Taylor's series, and in particular by using the first term in the Taylor's series containing the desired derivative. The general form of Taylor's series is as follows:

$$f(x) = f(x_0) + \sum_{k=1}^{\infty} \frac{(x - x_0)^k}{k!} f^{(k)}(x_0) \qquad (16)$$

where $f^{(k)}$ is the kth derivative of the function $f(x)$. The first-order expansion of Taylor's series takes the form:

$$f'(x) = \frac{f(x + \delta) - f(x)}{\delta}. \qquad (17)$$

Figure 4:
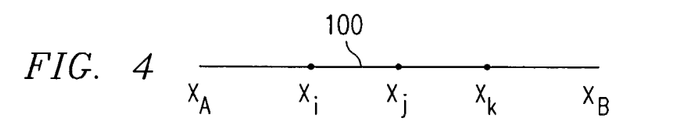
FIG. 4 is a further diagrammatic view of the beam of FIG. 2, showing different selected nodes which are arbitrary locations selected for use in analysis.

FIG. 4 is a further diagrammatic view of the beam 100, where $x_i$, $x_j$, and $x_k$ are three different points selected at arbitrary locations between the ends of the beam 100. These three points can all be different from the location of node 1 in FIG. 3. As to points $x_i$ and $x_j$, Equation (17) can be written as:

$$f'_i = \frac{f_j - f_i}{x_j - x_i} \qquad (18)$$

where:

$$\delta = x_j - x_i.$$

This is called the forward difference. Alternatively, $f'(x)$ could be approximated using a backward difference or a central difference. In the case of non-linear equations, use of the forward difference provides an explicit solution, whereas use of the backward or central difference provides an implicit solution.

With reference to Equation (18), similar expressions can be found for higher-order derivatives. For example, the second derivative can be expressed as:

$$f_i'' = \frac{f'_{(i+1)} - f'_{(i)}}{\delta}. \quad (19)$$

Substituting Equation (18) into Equation (19) leads to:

$$f_i'' = \frac{\frac{f_k - f_j}{x_k - x_j} - \frac{f_j - f_i}{x_j - x_i}}{\frac{x_k - x_i}{2}}. \quad (20)$$

Substituting Equation (20) into Equation (3), the differential formulation can be written as:

$$\frac{\frac{T_k - T_j}{x_k - x_j} - \frac{T_j - T_i}{x_j - x_i}}{\frac{x_k - x_i}{2}} + \frac{\dot{q}}{k} = 0. \quad (21)$$

As evident from the foregoing discussion, Equation (21) was obtained using only the first term in the Taylor's series containing the desired derivative. This approach has been found to provide relatively accurate results, as discussed later. Nevertheless, similar equations which are even more accurate can be obtained by using more terms from Taylor's series.

Figure 5:
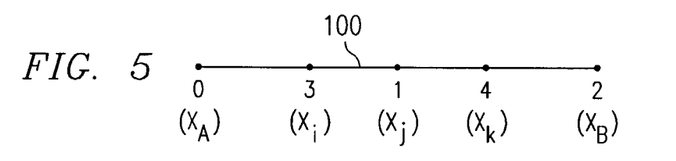
FIG. 5 is a yet another diagrammatic view of the beam of FIG. 2, showing additional nodes that represent mixed order approximation used for analysis.

Referring again to FIG. 1, the process proceeds from block 113 to block 114. Block 114 represents the next step, which is to combine the approximate solutions (obtained by piecewise approximation in association with blocks 111-112) with the differential formulation (obtained in association with block 113). In this regard, FIG. 5 is a diagrammatic view of the beam 100 which is similar to the view of FIG. 3, except that two additional nodes 3 and 4 have been added. The finite element depicted in FIG. 5 thus contains five nodes, whereas a second order curve element contains only three nodes, for example as shown in FIG. 3. These types of elements can also be referred to as hybrid elements. The use of five nodes in the hybrid element of FIG. 5 represents mixed element formulation (where a given finite element contains more nodes than the number of nodes for a corresponding standard finite element).

For the purpose of combining each piecewise approximation with the differential formulation, it is assumed that node 3 corresponds to point $x_i$, node 1 corresponds to point $x_j$, and node 4 corresponds to point $x_k$. The temperatures at nodes 3 and 4 can be obtained using Equation (15), which was developed in association with the piecewise approximation step of block 112 in FIG. 1. In particular, these two temperatures can be expressed as follows:

$$T_3 = [N_0 \ N_1 \ N_2]_{at \ x=x_3} \begin{Bmatrix} T_0 \\ T_1 \\ T_2 \end{Bmatrix} \quad (22)$$

$$T_4 = [N_0 \ N_1 \ N_2]_{at \ x=x_4} \begin{Bmatrix} T_0 \\ T_1 \\ T_2 \end{Bmatrix}.$$

Figure 6:
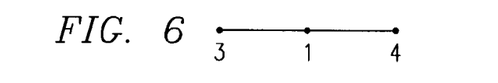
FIG. 6 is a diagrammatic view of part of the beam of FIG. 2, showing a subset of the nodes of FIG. 5.

FIG. 6 is a diagrammatic view similar to FIG. 5, except that it shows only the portion of the beam 100 of FIG. 5 which is between the nodes 3 and 4. With reference to FIG. 5, it is known that $T_3=T_i$, $T_1=T_j$, and $T_4=T_k$. As discussed above, Equation (21) is the differential formulation of governing Equation (3). For the specific segment of the beam 100 which is shown in FIG. 6, Equation (21) can be rewritten as:

$$\frac{\frac{T_4 - T_1}{x_4 - x_1} - \frac{T_1 - T_3}{x_1 - x_3}}{\frac{x_4 - x_3}{2}} + \frac{\dot{q}}{k} = 0. \quad (23)$$

Equation (23) can alternatively be expressed as:

$$[C_3 \ C_1 \ C_4] \begin{Bmatrix} T_3 \\ T_1 \\ T_4 \end{Bmatrix} + \frac{\dot{q}}{k} = 0 \quad (24)$$

where:

$$C_3 = \frac{2}{(x_1 - x_3)(x_4 - x_3)} \quad (25)$$

$$C_1 = \frac{2}{(x_4 - x_1)(x_3 - x_1)}$$

$$C_4 = \frac{2}{(x_1 - x_4)(x_3 - x_4)}.$$

As evident from Equation (22), the temperatures $T_3$ and $T_4$ at nodes 3 and 4 in FIGS. 5 and 6 can be expressed as functions of the temperatures $T_0$, $T_1$ and $T_2$ at nodes 0, 1 and 2. Consequently, Equation (24) can be rewritten as:

$$[K_0 \ K_1 \ K_2] \begin{Bmatrix} T_0 \\ T_1 \\ T_2 \end{Bmatrix} + d = 0 \quad (26)$$

where $K_0$, $K_1$ and $K_2$ are constants, and:

$$d = \frac{\dot{q}}{k}.$$

Equation (26) can be expressed in a more generic form as:

$$[K]\{T\} = \{F\}. \quad (27)$$

That is, Equation (27) is a generic representation of algebraic equations which are obtained by combining the approximate solutions (obtained through piecewise approximation) with the differential formulation.

Next, and referring again to FIG. 1, the process proceeds from block 114 to block 115. Blocks 115 represents the next step of the basic method described above. In block 115, boundary conditions are substituted into the algebraic equations represented generically by Equation (27). In the particular case of the beam 100 shown in FIG. 5, the Equation (27) has three unknowns, which are the temperatures $T_0$ $T_1$ and $T_2$. However, as mentioned earlier, the problem statement includes two boundary conditions, which are known temperatures at opposite ends of the beam 100. In particular, and as discussed earlier, the known temperatures are $T_A$ and $T_B$ at respective locations $x_A$ and $x_B$. In other words, the temperature $T_0$ at node 0 is $T_A$ and the temperature $T_2$ at node 2 is $T_B$. Substituting $T_A$ for $T_0$ and $T_B$ for $T_2$ in Equation (26), the only remaining unknown is the temperature $T_1$. Consequently, with reference to block 116 in FIG. 1, the algebraic equations represented by Equation (26) can be solved in order to obtain a value for the single unknown $T_1$. For efficiency, these equations can be solved using a computer. Various known equation solvers can be used to solve these equations, including but not limited to those that involve Gauss elimination, or lower and upper triangular (LU) decomposition.

Next, with reference to block 117 in FIG. 1, a report can be generated to convey the calculated solution to a person. Then, with reference to block 118, it is possible to use this report to modify the design that was the basis for the analysis. In the example under discussion, a modification to the design might involve changes to the shape or length of the beam 100, or its heat conduction characteristics. After modification of the design in block 118, and as indicated by a broken line, blocks 111-117 would be repeated, in order to repeat the process of FIG. 1 for the new design characteristics.

Figure 7:
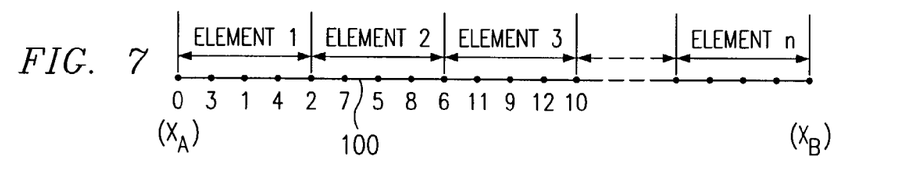
FIG. 7 is a diagrammatic view of the beam of FIG. 2, showing a different set of nodes selected for the purpose of analysis.

Up to this point, and as discussed above, it has been assumed for the sake of convenience and simplicity that the beam 100 was divided into only a single finite element. As a practical matter, however, the beam 100 would typically be divided into a number of finite elements. In this regard, FIG. 7 is a further diagrammatic view of the beam 100, showing that it has been divided into n finite elements. As discussed above in association with FIG. 5, five nodes were defined for the single hybrid finite element which is depicted in FIG. 5. In a similar manner, five nodes are defined within each of the n finite elements shown in FIG. 7. Where the ends of two elements are adjacent each other, the two elements share a common node. As will be evident from a brief comparison of FIGS. 5 and 7, nodes 1-4 in FIG. 7 are at locations along the beam 100 which are different from the locations of the nodes 1-4 in FIG. 5. The same procedure discussed above in association with FIGS. 1-6 is utilized, and results in a respective version of Equation (27) for each of the n finite elements. This set of algebraic equations can be expressed in the form:

$$[K]\begin{Bmatrix} T_0 \\ T_1 \\ \vdots \\ T_n \end{Bmatrix} = \{F\}. \tag{28}$$

Given boundary conditions such as those discussed above, Equation (28) can be readily solved using known equation solvers of the type discussed above, and provides relatively accurate results. As one specific example, assume that the beam 100 has a length of 100 millimeters, and that the isotropic thermal conductivity k is 50 W/m C°. Also assume that the beam 100 generates heat at a rate of 10 KW/m$^3$. Assume that the known temperatures (boundary conditions) $T_A$ and $T_B$ at opposite ends of the beam 100 are 2000° C. and 0° C., respectively. Referring to TABLE 1, the left column identifies six locations along the beam 100 in terms of the distance of each such location from the left end of the beam. The middle column gives the theoretical temperature value at each one of these six locations. The right column gives the temperature value determined for each of these locations using the numerical solution according to the invention, which involves piecewise approximation with differential formulation. It will be noted that each value in the right column corresponds very closely to the corresponding value in the middle column, thereby confirming that the numerical approach according to the invention provides very accurate results.

TABLE 1

| DISTANCE (mm) | THEORETICAL TEMPERATURE (° C.) | NUMERICAL SOLUTION (° C.) |
|---|---|---|
| 5 | 99.95 | 100.2 |
| 10 | 199.9 | 200.4 |
| 20 | 400 | 401 |
| 40 | 800 | 802 |
| 60 | 1200 | 1203 |
| 80 | 1601 | 1604 |

As explained above, the beam 100 of FIG. 2 has relatively small transverse dimensions that are negligible in comparison to its length. Consequently, the foregoing analysis of the beam 100 was carried out as a one-dimensional analysis in a direction along the length of the beam 100. However, the method of FIG. 1 can be used not only for one-dimensional analysis, but also for multi-dimensional analysis.

Figure 8:
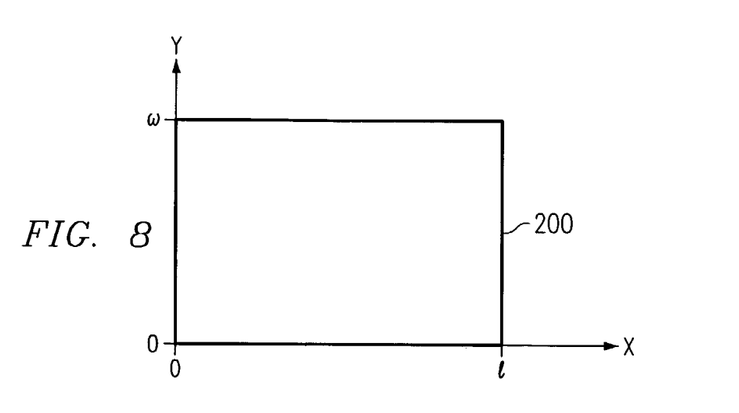
FIG. 8 is a diagrammatic view of a plate which is a different object that is used to demonstrate a two-dimensional analysis using techniques according to the invention.

As an example of multi-dimensional analysis, FIG. 8 is a diagrammatic view of a thermally conductive plate 200, which is rectangular and has a length l along an x axis, and a width w along a y axis. The plate 200 has, in a direction perpendicular to the plane of FIG. 8, a thickness which is much smaller than either the length l or the width w, and which is thus negligible in comparison to the length and width. Accordingly, heat conduction within the plate 200 is treated as a two-dimensional analysis. With respect to two-dimensional steady state heat conduction within the plate 200, where the material of the plate 200 is isotropic and generates no heat, Equation (1) reduces to:

$$\frac{\partial^2 T}{\partial x^2} + \frac{\partial^2 T}{\partial y^2} = 0. \tag{29}$$

For two-dimensional steady state heat conduction, Equation (29) represents Laplace's equation of elliptic type. With reference to the plate 200 of FIG. 8, it is assumed that known boundary conditions exist along the four edges of the plate, in the form of the following known temperatures:

T=0 along x=0

T=0 along y=0

T=0 along x=l

T=$T_{max}$ along y=w.

Figure 9:
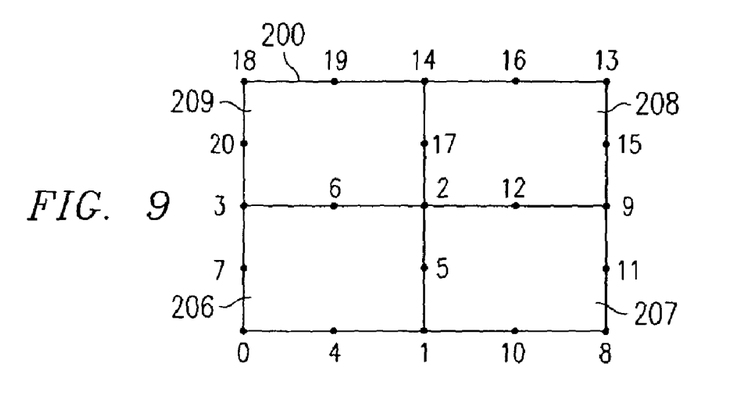
FIG. 9 is a diagrammatic view of the plate of FIG. 8, subdivided into several finite elements and showing a number of selected nodes throughout the plate.

With reference to block 111 in FIG. 1, the plate 200 is first divided into m second-order quadrilateral finite elements. FIG. 9 is a diagrammatic view of the plate 200, where m=4. In other words, the plate 200 has been divided into four rectangular finite elements 206-209 in FIG. 9, each of which has eight nodes.

Figure 10:
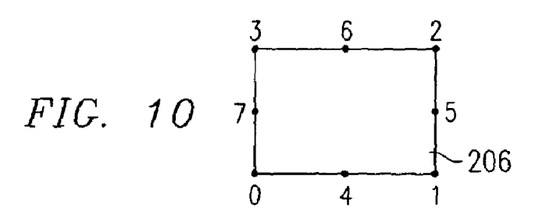
FIG. 10 is a diagrammatic view of one finite element from FIG. 9, and the nodes associated with it.

Next, with reference to block 112 in FIG. 1, the temperature distribution T in any of these four finite elements can be approximated using the equation:

$$T=a_0+a_1x+a_2y+a_3x^2+a_4xy+a_5y^2+a_6x^2y+a_7xy^2. \tag{30}$$

where $a_0$ through $a_7$ are respective coefficients. FIG. 10 is a diagrammatic view of the finite element 206 from FIG. 9, and its eight nodes. Equation (30) can be written in terms of a shape function as:

$$T = [N] \begin{Bmatrix} T_0 \\ T_1 \\ \vdots \\ T_7 \end{Bmatrix}. \qquad (31)$$

where [N] is the standard shape function matrix for a second-order quadrilateral element.

Figure 11:
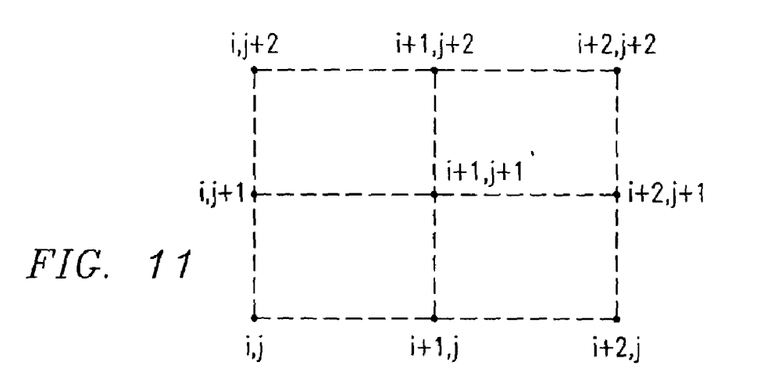
FIG. 11 is a diagrammatic view of several nodes selected at arbitrary locations within the plate of FIG. 8.

Next, with reference to block 113 in FIG. 1, a differential formulation of governing differential Equation (29) is developed for the entire region, or in other words for the entire plate 200 of FIG. 9. In this regard, FIG. 11 is a diagrammatic view of a portion of the plate 200, with eight arbitrary node locations provided around a selected node i+1, j+1. The first term $$\frac{\partial^2 T}{\partial x^2}$$

of governing Equation (29) can be expressed using forward difference and Taylor's series as:

$$\frac{\frac{T_{i+2,j+1} - T_{i+1,j+1}}{x_{i+2,j+1} - x_{i+1,j+1}} - \frac{T_{i+1,j+1} - T_{i,j+1}}{x_{i+1,j+1} - x_{i,j+1}}}{\frac{x_{i+2,j+1} + x_{i,j+1}}{2}}. \qquad (32)$$

Similarly, the second term $$\frac{\partial^2 T}{\partial y^2}$$

of Equation (29) can be expressed as:

$$\frac{\frac{T_{i+1,j+2} - T_{i+1,j+1}}{y_{i+1,j+2} - y_{i+1,j+1}} - \frac{T_{i+1,j+1} - T_{i+1,j}}{y_{i+1,j+1} - y_{i+1,j}}}{\frac{y_{i+1,j+2} + y_{i+1,j}}{2}}. \qquad (33)$$

Consequently, substituting Equations (32) and (33) for the first and second terms of Equation (29) yields:

$$\frac{\frac{T_{i+2,j+1} - T_{i+1,j+1}}{x_{i+2,j+1} - x_{i+1,j+1}} - \frac{T_{i+1,j+1} - T_{i,j+1}}{x_{i+1,j+1} - x_{i,j+1}}}{\frac{x_{i+2,j+1} + x_{i,j+1}}{2}} + \qquad (34)$$

$$\frac{\frac{T_{i+1,j+2} - T_{i+1,j+1}}{y_{i+1,j+2} - y_{i+1,j+1}} - \frac{T_{i+1,j+1} - T_{i+1,j}}{y_{i+1,j+1} - y_{i+1,j}}}{\frac{y_{i+1,j+2} + y_{i+1,j}}{2}} = 0.$$

Figure 12:
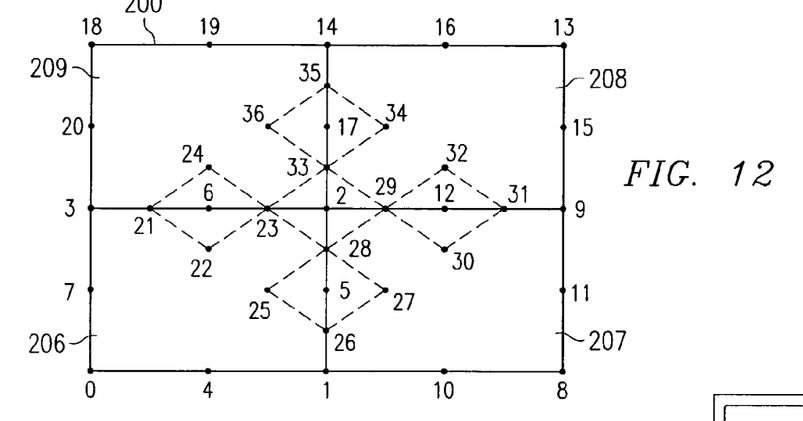
FIG. 12 is a diagrammatic view of the plate which is similar to FIG. 9 but which shows additional selected nodes that represent mixed order approximation used for analysis.

Next, with reference to block 114 of FIG. 1, the various approximate solutions for the respective finite elements, in the form of respective versions of Equation (29), are combined with the differential formulation represented by Equation (34), in order to obtain a set of algebraic equations. In this regard, and in view of the boundary conditions discussed above, temperatures are known along all edges of the plate, and thus the unknown temperatures are all at locations spaced inwardly from the edges of the plate. Therefore, and with reference to FIG. 9, the unknown temperatures in the algebraic equations are the temperature $T_2$ at node 2, the temperature $T_5$ at node 5, the temperature $T_6$ at node 6, the temperature $T_{12}$ at node 12, and the temperature $T_{17}$ at node 17. To find these unknowns using differential formulation, extra nodes are added to each of the finite elements 206-209 (hybrid elements), for example as shown by nodes 21-36 in FIG. 12. FIG. 12 is a diagrammatic view of the plate 200 which is similar to FIG. 9, except that FIG. 12 shows the additional nodes. As mentioned above, the use of additional nodes represents mixed element formulation involving hybrid finite elements.

Combining the piecewise approximation for each finite element with the differential formulation for the entire domain results in n algebraic equations of the form:

$$[K]\{T\} = \{F\}. \qquad (35)$$

Next, with reference to blocks 115 and 116 of FIG. 1, the boundary conditions along the edges of the plate 200 can be substituted into the set of algebraic equations represented by Equation (35), and then these equations can be solved, for example with a known type of equation solver, such as a solver utilizing Gauss elimination, or lower and upper triangular (LU) decomposition.

As one specific example of a solution, assume that the length and width of the plate 200 are l=100 and w=200. Also assume that the temperature $T_{max}$ along y=0 is 100 C°, and that the temperature along all of the other edges is 0. With these parameters, the analytical solution is:

$$T(x, y) = \frac{400}{\pi} \sum_{n=0}^{\infty} \frac{1}{(2n+1)} \sin\left(\frac{(2n+1)\pi}{a} x\right) \qquad (36)$$

$$\sinh\left(\frac{(b-y)(2n+1)\pi}{a}\right) \cos ech\left(\frac{(2n+1)\pi}{a} b\right).$$

Figures 13, 14:
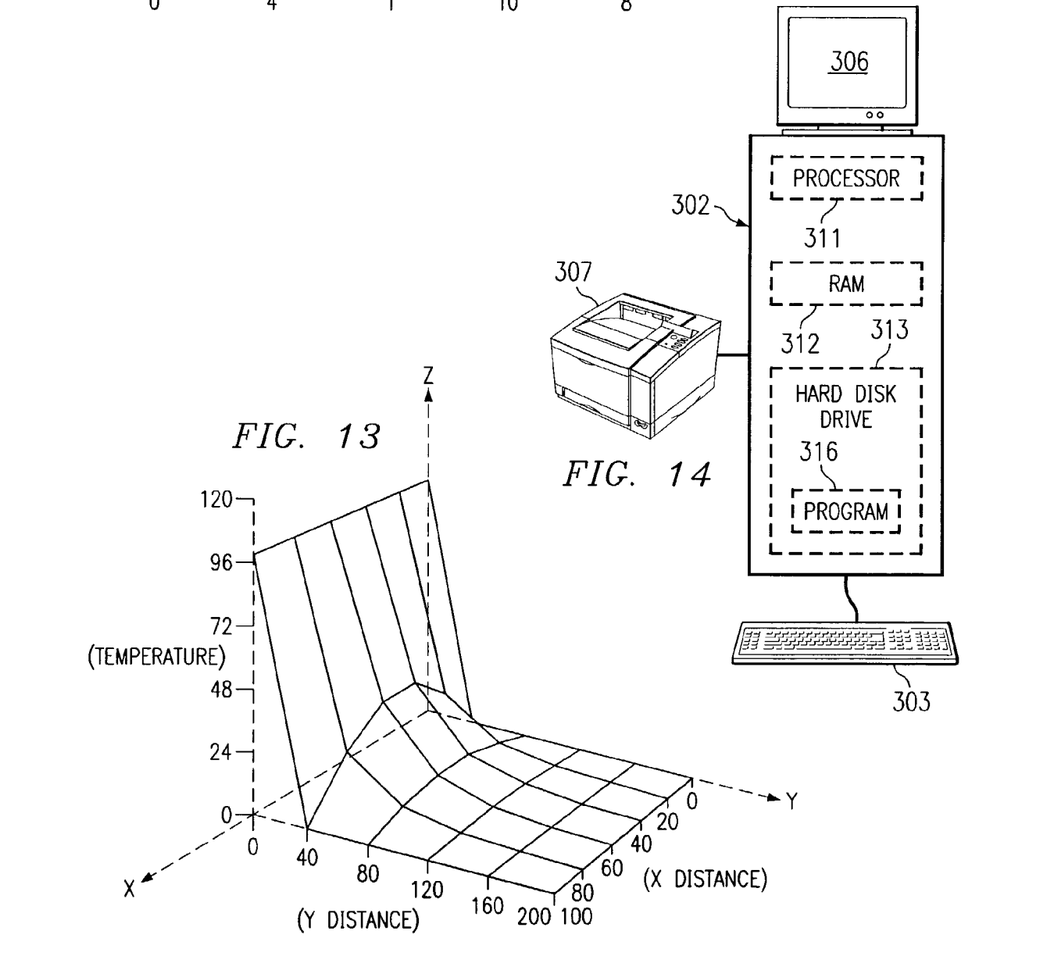
FIG. 13 is a graph showing temperature distribution information obtained using techniques according to the invention.
FIG. 14 is a diagrammatic view of a computer system which can be used to carry out the method shown in the flowchart of FIG. 1.

The left column of TABLE 2 identifies selected points within the interior of the plate 200. The middle column gives the theoretical solution provided by Equation (36). The right column gives the numerical solution obtained with Equation (35), using the approach according to the present invention. It will be noted that each value in the third column of TABLE 2 is very close to the corresponding value in the second column of TABLE 2, thereby indicating that the numerical solution according to the present invention provides very accurate results in comparison to a theoretical solution of the same problem. FIG. 13 presents the temperature distribution information from TABLE 2, in the form of a graph.

TABLE 2

| COORDINATES (x, y) | THEORETICAL TEMPERATURE (° C.) | NUMERICAL SOLUTION (° C.) |
|---|---|---|
| 20, 40 | 22.23 | 21.42 |
| 20, 80 | 6.081 | 5.83 |
| 20, 120 | 1.7147 | 1.56 |
| 20, 160 | 0.73029 | 0.696 |
| 40, 40 | 33.891 | 34.081 |
| 40, 80 | 9.9791 | 9.3235 |
| 40, 120 | 2.7734 | 2.5277 |
| 40, 160 | 0.730311 | 0.64116 |
| 60, 40 | 33.891 | 34.081 |
| 60, 80 | 9.9791 | 9.3235 |
| 60, 120 | 2.773498 | 2.5277 |

TABLE 2-continued

| COORDINATES (x, y) | THEORETICAL TEMPERATURE (° C.) | NUMERICAL SOLUTION (° C.) |
|---|---|---|
| 60, 160 | 0.730311 | 0.64116 |
| 80, 40 | 22.23 | 21.397 |
| 80, 80 | 6.0816 | 5.76290 |
| 80, 120 | 1.71494 | 1.5622 |
| 80, 160 | 0.451411 | 0.396 |

FIG. 14 is a diagrammatic view of a computer system 301 which can be used to carry out the method shown in the flowchart of FIG. 1. The hardware of the computer system 301 is conventional, and for example may be implemented with a personal computer of a type commercially from Dell Computer Corporation of Austin, Tex. Alternatively, the hardware could be a workstation of a type commercially available from Sun Microsystems, Inc. of Santa Clara, Calif. The hardware of the computer system 301 includes a system unit 302, and a standard keyboard 303 which an operator can use as an input device to introduce information into the computer system 301. The computer system 301 further includes a display 306, which can be a cathode ray tube (CRT) display, a liquid crystal display (LCD), or some other type of display. The computer system 301 also includes a printer of a known type, which operates under control of the system unit 302.

The system unit 302 includes a processor 311 of a known type, such as a processor commercially available under the trademark PENTIUM from Intel Corporation of Santa Clara, Calif. The system unit 302 includes some random access memory (RAM) 312, which serves as temporary storage where the processor 311 can store at least part of a program it is executing, and/or data being processed by such a program. The system unit 302 includes a hard disk drive (HDD) 313 of a standard type.

The information stored on the HDD 313 includes a computer program 316, which can be executed by the processor 311, and which implements the method shown in the flowchart of FIG. 1. When the program 316 is being executed by the processor 311, an operator can use the keyboard 303 to provide the program with certain initial information or parameters, such as an identification of the shape of an object, values for boundary conditions relating to the object, an identification of a governing differential equation, and so forth. Program 316 may have predefined lists for various parameters such as the object shape, the governing differential equation, and so forth, such that the operator can make appropriate selections from relevant lists.

Based on the initial information provided by the operator, the program 316 can automatically carry out the analysis represented by blocks 111-117 in FIG. 1. With respect to block 117, the computer system 301 can generate a report by printing it on paper using the printer 307, or by presenting it on the display 306. For example, the report might include calculated temperature distribution information in the form of a table, similar to TABLE 1 or TABLE 2, or in the form of a graph, similar to FIG. 13. With reference to block 118 in FIG. 1, modification of the design may be effected by permitting the operator to change some of the initial information that the operator previously supplied to the computer system 301 through the keyboard 303.

From the foregoing examples, it should be clear that the present invention involves a method which can be used to solve governing equations of the type previously solved by other pre-existing numerical techniques, such as finite difference, finite element and boundary element methods.

The present invention provides a number of advantages. One such advantage is that the method according to the invention is conceptually simple and computationally efficient, due in part to the use of differential formulation. A solution can be obtained more rapidly than with pre-existing numerical approaches. A further advantage is that the resulting solution is very accurate, and in fact is more accurate than solutions obtained with other pre-existing numerical methods, because of the use of a higher-order approximation for each finite element. Still another advantage is that the method according to the invention can be used for solving a wide variety of differential equations relating to a wide variety of applications, including thermal analysis, fluid analysis, structural analysis, and vibration analysis.

Although selected embodiments have been illustrated and described in detail, it will be recognized that various substitutions and alterations are possible without departing from the spirit and scope of the present invention, as defined by the following claims.

What is claimed is:

1. A computer-readable medium encoded with a computer program operable to perform a method comprising the steps of:
   receiving input comprising a description of a thermally conductive physical object and a differential equation representing heat conduction of the physical object;
   dividing a region into a plurality of finite elements to resolve an engineering problem, the region representing at least a portion of the physical object analyzed by the engineering problem;
   determining for each of said finite elements a respective approximate solution for the differential equation which relates to said region, the approximate solution determined according to piecewise approximation of said region, the differential equation describing a physical property of the object and comprising one or more derivatives;
   expressing each of the one or more derivatives according to a series expansion of each of the one or more derivatives to yield an expressed derivative;
   determining a differential formulation which approximates said differential equation by substituting the expressed derivative for each of the one or more derivatives of the differential equation;
   combining said determined approximate solutions and said differential formulation to obtain a set of algebraic equations;
   establishing a characteristic comprising heat conduction of the object using the set of algebraic equations in order to resolve the engineering problem; and
   displaying on a computer display a report describing the heat conduction of the object that resolves the engineering problem.

2. The computer-readable medium according to claim 1, the method:
   including at least one known condition which relates to said region and which corresponds to an unknown in said set of algebraic equations;
   including the step of substituting each said known condition into said set of algebraic equations, and
   including the step of solving said algebraic equations for a further unknown.

3. The computer-readable medium according to claim 2, wherein each said known condition is a respective boundary condition.

4. The computer-readable medium according to claim 2, the method including the step of generating a report which presents information generated during said solving step.

5. The computer-readable medium according to claim 2,
wherein the physical characteristic is associated with a design property of the object,
wherein the differential equation is representative of the design property of the object, and
including the step of using information generated during said solving step to modify said design property of said object.

6. The computer-readable medium according to claim 1, the method:
including the step of defining a plurality of nodes in each of said finite elements;
wherein said step of determining said approximate solutions includes the step of determining each of said approximate solutions as a function of a subset of said nodes which are within the finite element corresponding to that approximate solution; and
wherein said step of determining said differential formulation includes the step of determining said differential formulation as a function of a set of node variables representative of the nodes within any of said finite elements.

7. The computer-readable medium according to claim 6, the method including the step of selecting the number of said node variables so that said differential formulation is a mixed element formulation.

8. The computer-readable medium according to claim 1, wherein the expansion series is an expansion of Taylor's series.

9. The computer-readable medium according to claim 8, the method including the step of selecting as said expansion of Taylor's series a first order expansion of Taylor's series.

10. The computer-readable medium according to claim 9, the method including the step of selecting as said expansion of Taylor's series a first term of said first order expansion of Taylor's series.

11. The computer-readable medium according to claim 1, wherein said differential formulation is carried out using finite differences with a forward difference approach.

12. The computer-readable medium according to claim 1, wherein said differential formulation is carried out using finite differences with a backward difference approach.

13. The computer-readable medium according to claim 1, wherein said differential formulation is carried out using finite differences with a central difference approach.

14. The computer-readable medium according to claim 1, wherein each said approximate solution is at least a second order solution.

15. The computer-readable medium according to claim 14, wherein at least one of said approximate solutions is a higher order solution than another of said approximate solutions.

16. A computer-readable medium encoded with a computer program, said computer program being operable when executed to:
receive input comprising a description of a thermally conductive physical object and a differential equation representing heat conduction of the physical object;
divide a region into a plurality of finite elements to resolve an engineering problem, the region representing at least a portion of the physical object analyzed by the engineering problem;
determine for each of said finite elements a respective approximate solution for the differential equation which relates to said region, the approximate solution determined according to piecewise approximation of said region, the differential equation describing a physical property of the object and comprising one or more derivatives;
express each of the one or more derivatives according to a series expansion of each of the one or more derivatives to yield an expressed derivative;
determine a differential formulation which approximates said differential equation by substituting the expressed derivative for each of the one or more derivatives of the differential equation;
combine said determined approximate solutions and said differential formulation to obtain a set of algebraic equations;
establish a characteristic comprising heat conduction of the object using the set of algebraic equations in order to resolve the engineering problem; and
provide display on a computer display a report the characteristic describing the heat conduction of the object that resolves the engineering problem.

17. A computer-readable medium according to claim 16,
including at least one known condition which relates to said region and which corresponds to an unknown in said set of algebraic equations; and
wherein said computer program is further operable when executed to substitute each said known condition into said set of algebraic equations, and to solve said algebraic equations for a further unknown.

18. A computer-readable medium according to claim 16, wherein said computer program is further operable when executed to:
define a plurality of nodes in each of said finite elements;
effect said determination of said approximate solutions in a manner which includes determining each of said approximate solutions as a function of a subset of said nodes which are within the finite element corresponding to that approximate solution; and
effect said determination of said differential formulation in a manner which includes determining said differential formulation as a function of a set of node variables representative of the nodes within any of said finite elements.

19. A computer-readable medium according to claim 16, wherein said computer program is further operable when executed to effect said determination of said differential formulation in a manner which includes approximating said differential equation based on an expansion of Taylor's series.

20. A system comprising:
a system unit configured to:
receive input comprising a description of a thermally conductive physical object and a differential equation representing heat conduction of the physical object;
divide a region of interest into a plurality of higher order finite elements to resolve an engineering problem, the region representing at least a portion of the physical object analyzed by the engineering problem;
determine for each of said finite elements a respective approximate solution for the differential equation based on piecewise approximation relating to said region, the differential equation describing a physical property of the object and comprising one or more derivatives;

express each of the one or more derivatives according to a series expansion of each of the one or more derivatives to yield an expressed derivative;

determine a differential formulation which approximates a governing equation by substituting the expressed derivative for each of the one or more derivatives of the differential equation;

combine said determined approximate solutions and said differential formulation using mixed order approximation to obtain a set of algebraic equations; and establish a characteristic comprising heat conduction of the object using the set of algebraic equations in order to resolve the engineering problem; and a display configured to;

display a report of the characteristic describing the heat conduction of the object that resolves the engineering problem.

* * * * *